(12) United States Patent
Yamamoto et al.

(10) Patent No.: US 12,071,744 B2
(45) Date of Patent: Aug. 27, 2024

(54) CONTACT PREVENTION DEVICE FOR WORK MACHINE

(71) Applicant: Yanmar Power Technology Co., Ltd., Osaka (JP)

(72) Inventors: Miroku Yamamoto, Osaka (JP); Katsuhiro Baba, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 279 days.

(21) Appl. No.: 17/439,391

(22) PCT Filed: Feb. 25, 2020

(86) PCT No.: PCT/JP2020/007551
§ 371 (c)(1),
(2) Date: Sep. 14, 2021

(87) PCT Pub. No.: WO2020/189194
PCT Pub. Date: Sep. 24, 2020

(65) Prior Publication Data
US 2022/0154425 A1    May 19, 2022

(30) Foreign Application Priority Data

Mar. 15, 2019   (JP) ................................ 2019-049102

(51) Int. Cl.
*E02F 9/20*    (2006.01)
*B60W 50/14*   (2020.01)
(Continued)

(52) U.S. Cl.
CPC ........... *E02F 9/2033* (2013.01); *B60W 50/14* (2013.01); *E02F 9/2203* (2013.01);
(Continued)

(58) Field of Classification Search
CPC ....... E02F 9/2033; E02F 9/2203; E02F 3/435; E02F 9/2285; E02F 9/2296; E02F 3/325;
(Continued)

(56) References Cited

U.S. PATENT DOCUMENTS

| | | | | |
|---|---|---|---|---|
| 2009/0082949 A1* | 3/2009 | Petrie | ..................... | G06Q 10/08 |
| | | | | 701/119 |
| 2015/0061895 A1* | 3/2015 | Ricci | ..................... | B60K 28/00 |
| | | | | 340/902 |
| 2018/0258616 A1* | 9/2018 | Kiyota | ..................... | G06T 1/00 |

FOREIGN PATENT DOCUMENTS

| | | |
|---|---|---|
| JP | 2013-204411 A | 10/2013 |
| JP | 2018-021374 A | 2/2018 |
| JP | 6468444 B2 | 2/2019 |

* cited by examiner

*Primary Examiner* — Tyler D Paige
(74) *Attorney, Agent, or Firm* — Chris Mizumoto (57) ABSTRACT

This contact prevention device for a construction machine is provided with a ToF camera, an object determination unit, an obstacle information output unit, and a notification device. The ToF camera is provided with a light-emitting unit and a light-receiving unit, and can detect the received light intensity and the timing at which the light-receiving unit receives reflected light, which is light from the light-emitting unit that hits and is reflected by an object. The object determination unit determines the object on the basis of at least the received light intensity. The obstacle information output unit outputs information relating to an obstacle. The notification device makes a notification depending on the output results of the obstacle information output unit. The obstacle information output unit generates information relating to the obstacle on the basis of the distance to the object acquired by the ToF camera and the determination results of the object determination unit.

5 Claims, 10 Drawing Sheets

(51) Int. Cl.
 *E02F 9/22* (2006.01)
 *G01S 17/894* (2020.01)
 *G01S 17/931* (2020.01)
(52) U.S. Cl.
 CPC .......... *G01S 17/894* (2020.01); *G01S 17/931* (2020.01); *B60W 2050/143* (2013.01); *B60W 2050/146* (2013.01); *B60W 2300/17* (2013.01)
(58) Field of Classification Search
 CPC .......... E02F 9/24; E02F 9/262; B60W 50/14; B60W 2050/143; B60W 2050/146; B60W 2300/17; G01S 17/894; G01S 17/931
 USPC .......................................................... 701/50
 See application file for complete search history.

CONTACT PREVENTION DEVICE FOR WORK MACHINE

CROSS-REFERENCE

This application is a US National Stage Application under 35 U.S.C. § 371 of International Application No. PCT/JP2020/007551 filed Feb. 25, 2020, which claims foreign priority of JP2019-049102 filed Mar. 15, 2019, the disclosures of which are hereby incorporated by reference in their entirety.

TECHNICAL FIELD

The present invention relates to a contact prevention device that prevents an obstacle from coming into contact with a work machine.

BACKGROUND ART

Conventionally, a configuration in which the approach of a worker or the like to a work machine is detected is known. Patent Literatures 1 and 2 each disclose this type of contact prevention device.

A peripheral monitoring device for a work machine of Patent Literature 1 is configured to determine the presence or absence of a person around a work machine by detecting a moving body on the basis of the output of a moving body detection sensor or an image sensor attached to the work machine.

A safety device for a work machine of Patent Literature 2 includes an infrared ray receiving means and a radio wave transmitting means attached to a worker. The radio wave transmitting means transmits a radio wave signal while the infrared ray receiving means receives an infrared ray signal transmitted from the work machine side. While the radio signal is received on the work machine side, the drive of the work machine is forcibly stopped.

CITATION LIST

Patent Literature

Patent Literature 1: Japanese Patent Laid-Open No. 2017-223111
Patent Literature 2: Japanese Patent Laid-Open No. 2014-47607

DISCLOSURE OF INVENTION

Problems to be Solved by the Invention

In the configuration of Patent Literature 1, the presence or absence of a person is determined by detection of a moving object, and therefore detection of a person may fail when the person moves little.

The configuration of Patent Literature 2 requires a device that receives an infrared ray and transmits a radio signal for each person, which complicates the configuration.

The present invention has been made in view of the above circumstances, and an object of the present invention is to provide a contact prevention device capable of reliably detecting an obstacle while determining the obstacle with a simple configuration.

Means for Solving the Problems

Effect of the Invention

The problem to be solved by the present invention is described above, and the means for solving the problem and the effect thereof will be described in the following.

According to an aspect of the present invention, there is provided a contact prevention device for a work machine having the following configuration. That is, this contact prevention device for a work machine includes a three-dimensional measurement sensor, an object determination unit, an obstacle information output unit, and a notification device. The three-dimensional measurement sensor includes a light-emitting unit and a light-receiving unit, and is capable of detecting timing at which the light-receiving unit receives light from the light-emitting unit which is reflected by hitting at an object and the received light intensity, and then hits an object to be reflected. The object determination unit determines the object on the basis of at least the received light intensity. The obstacle information output unit outputs information related to an obstacle. The notification device makes a notification in accordance with an output result from the obstacle information output unit. The obstacle information output unit generates information related to the obstacle on the basis of a distance to the object acquired by the three-dimensional measurement sensor, and a determination result from the object determination unit.

Consequently, it is possible to detect the three-dimensional position of the obstacle by the three-dimensional measurement sensor, and use the result of determining the attribute of the obstacle (e.g., human and other) in the object determination unit to operate the notification device, for example, only when a person approaches. Accordingly, while unexpected situations are prevented, work efficiency can be improved by reducing the number of situations in which work stops unnecessarily during work.

In the contact prevention device for a work machine, the following configuration is preferable. That is, this contact prevention device for a work machine includes an imaging device and a display device. The imaging device images a surrounding of the work machine. The display device composites a position of the object detected by the three-dimensional measurement sensor to an image obtained by the imaging device, to perform display. The display device is capable of compositing the position of the object to a corresponding position of a viewpoint transformation image obtained by transforming a viewpoint of an image output by the imaging device, to perform display.

Consequently, the operator can intuitively confirm the surrounding situation by displaying an image transformed at an easy-to-see viewpoint. In addition, the position of the detected object and the determination result are composited in the same image, and therefore an operator more easily understands the status of the surroundings of the obstacle.

In the contact prevention device for a work machine, control for decreasing a driving speed of an actuator provided in the work machine is preferably performed in accordance with the output result from the obstacle information output unit.

Consequently, for example, when a person approaches the work machine, the operation of the work machine is automatically decelerated, so that the operation of the work machine becomes more cautious and is unlikely to cause an unexpected situation.

In the contact prevention device for a work machine, the following configuration is preferable. That is, this contact prevention device for a work machine includes a storage unit that stores an operation stop region which is determined as a surrounding of the work machine. When the position of the object output by the obstacle information output unit is included in the operation stop region, control for stopping the actuator provided in the work machine is performed.

Consequently, for example, when a person intrudes in a region that is a blind spot for the operator, the operation of the work machine is automatically stopped, so that it is possible to prevent unexpected situations before happens.

In the contact prevention device for a work machine, when the position of the object output by the obstacle information output unit is not included in the operation stop region, and is changing in such a direction as to approach the operation stop region, the notification device preferably makes a notification.

Consequently, for example, when a person is approaching a region that is a blind spot for an operator, the operator easily notices the person at an early stage.

DESCRIPTION OF EMBODIMENTS

Figure 1:
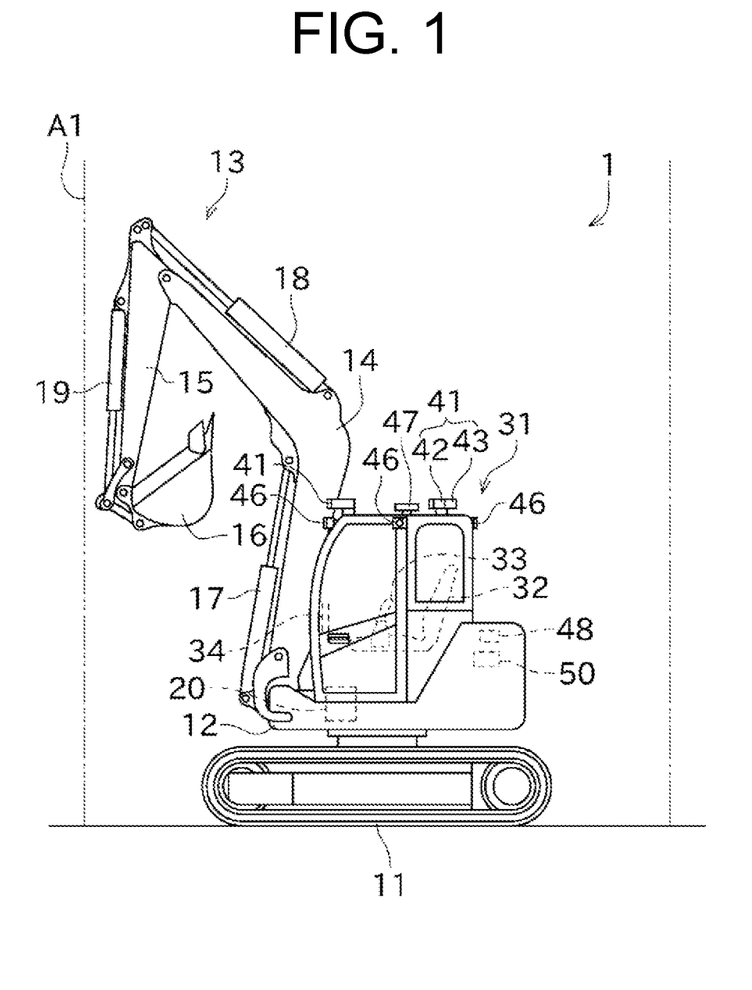
FIG. 1 is a side view illustrating an overall configuration of a construction machine according to an embodiment of the present invention.
Figure 2:
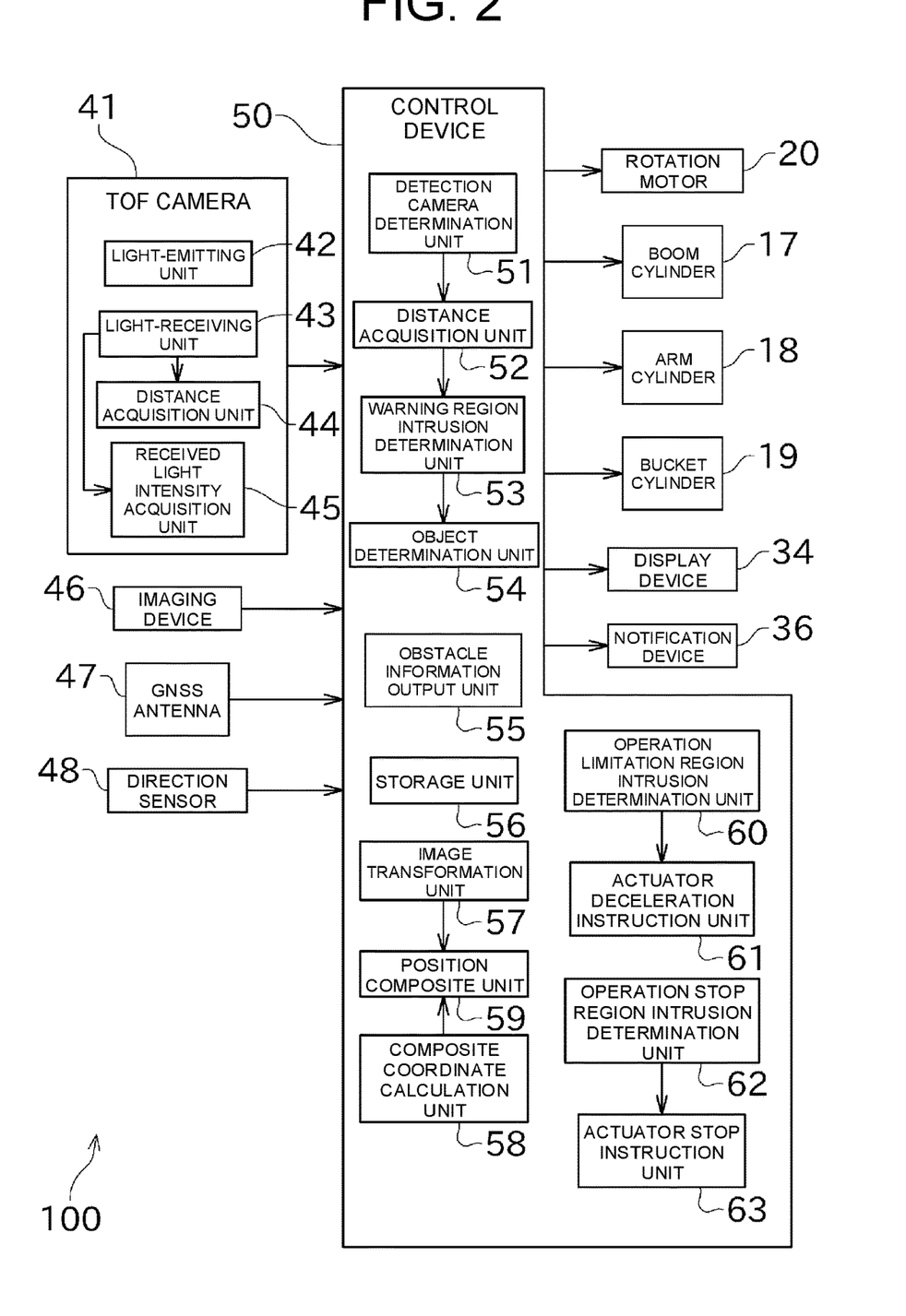
FIG. 2 is a functional block diagram of a contact prevention device provided in the construction machine.

Now, an embodiment of the present invention will be described with reference to the drawings. FIG. 1 is a side view of a construction machine 1 according to an embodiment of the present invention. FIG. 2 is a functional block diagram of a contact prevention device 100 provided in the construction machine 1.

The construction machine (work machine) 1 is used at a construction site, a demolition site, a mine, or the like, and performs civil engineering and construction work. The construction machine 1 mainly performs excavation work, especially excavation of earth and sand.

As illustrated in FIG. 1, the construction machine 1 includes crawlers 11, a rotating body 12, and a work machine 13.

A pair of the crawlers 11 are arranged on left and right. The left and right crawlers 11 are driven in response to the operation of an operator. This allows the construction machine 1 to travel.

The rotating body 12 is supported by the crawlers 11. The rotating body 12 is configured to be rotatable with the direction perpendicular to the crawlers 11 (vertical direction of the construction machine 1) as a rotation axis. The rotation of the rotating body 12 is performed by driving of the rotation motor 20 mounted on this rotating body 12.

The work machine 13 is mounted on the rotating body 12. The work machine 13 performs the above excavation work in response to the operation of the operator.

The work machine 13 includes a boom 14, an arm 15, and a bucket 16.

The boom 14 is configured as an elongated member. One end of the boom 14 is rotatably mounted on a front portion of the rotating body 12. A boom cylinder 17 that is a hydraulic cylinder is mounted on the boom 14, and the boom 14 can be rotated by expansion and contraction of the boom cylinder 17.

The arm 15 is an elongated member similar to the boom 14. One end of the arm 15 is rotatably supported at a leading end of the boom 14. The construction machine 1 includes an arm cylinder 18 for rotating the arm 15.

The bucket 16 is configured as a container-shaped member. One end of the bucket 16 is rotatably supported by a leading end of the arm 15. The construction machine 1 includes a bucket cylinder 19 for rotating the bucket 16. The bucket 16 is rotated in a state in which the boom 14 and arm 15 are rotated and a position of the bucket 16 is adjusted, so that a posture of the bucket 16 is changed to perform scooping operation/dumping operation. Consequently, earth and sand are excavated.

On the upper side of the rotating body 12, a cabin 31 is disposed for allowing an operator to board. A driver seat 32, an operation lever 33, a display device 34 are disposed inside the cabin 31. An operator can sit on the driver seat 32. The operation lever 33 is used in order to allow an operator to operate the work machine 13. In addition to the operation lever 33, other appropriate operation members are disposed around the driver seat 32. Examples of the operation members can include a traveling lever for indicating traveling of the construction machine 1 and an accelerator lever for increasing the engine speed.

In the following, assuming that the direction in which the operator sitting on the driver seat 32 faces is the front, the front-back direction and the left-right direction are defined. Unless otherwise mentioned, the direction of the construction machine 1 means the direction of the rotating body 12 (i.e., the direction of the operator sitting), not the crawlers 11.

The display device 34 is a liquid crystal display or an organic EL display, or the like, and can display a variety of information. The display device 34 is disposed so as to face the driver seat 32. In other words, the display device 34 is disposed at a position in the field of view of the operator who sits on the driver seat 32 and looks forward.

The notification device 36 is, for example, a buzzer or a speaker, and can provide an audible notification to an operator.

The construction machine 1 includes Tof cameras (three-dimensional measurement sensors) 41, imaging devices 46, a GNSS antenna 47, and a direction sensor 48 as information acquisition devices that acquire information of the surroundings. The information acquired by these information acquisition devices is output to a control device 50.

The Tof the cameras 41 each perform three-dimensional measurement of the surroundings of the construction machine 1 to obtain a position and a shape of an object that exists in the vicinity of the construction machine 1. The Tof is an abbreviation for Time of flight. The Tof camera is a kind of three-dimensional LiDAR. The LiDAR is an abbreviation for Light Detection and Ranging. However, a variety of other three-dimensional measurement sensors can be used in place of the Tof cameras 41.

Each of the Tof cameras 41 has a light-emitting unit 42 and a light-receiving unit 43. Each light-emitting unit 42 radiates light. Each light-receiving unit 43 can detect reflected light that is reflected on an object. The light-emitting unit 42 and the light-receiving unit 43 are disposed in close proximity to each other.

In addition to the light-emitting unit 42 and the light-receiving unit 43, each Tof camera 41 includes a distance acquisition unit 44 and a received light intensity acquisition unit 45 illustrated in FIG. 2.

The distance acquisition unit 44 can acquire a distance to a surrounding object by measuring time from when the light-emitting unit 42 radiates light to when the light-receiving unit 43 receives reflected light.

Each Tof camera 41 is well known, and therefore a basic principle will be briefly described herein. The light-emitting unit 42 of the Tof camera 41 radiates light to the surroundings such that the intensity repeatedly changes in a certain period. The phase of the received light intensity of the reflected light detected by the light-receiving unit 43 changes in accordance with a distance between the Tof camera 41 and the reflection object that reflects the light. The distance acquisition unit 44 can obtain a distance between the reflection object and the Tof camera by calculation, on the basis of this phase shift.

The received light intensity acquisition unit 45 acquires received light intensity that is the intensity of light detected by the light-receiving unit 43. The received light intensity can also be viewed as the percentage of light reflected by the reflection object (reflectance).

As illustrated in FIG. 1, the Tof cameras 41 are mounted on an upper end of the cabin 31. The three Tof cameras 41 are disposed side by side in the circumferential direction so as to divide the 360° circumference of the cabin 31 into three sections. Consequently, it possible to detect the surroundings over the entire circumference of the cabin 31.

The imaging devices 46 are each a camera that images the surroundings of the cabin 31 to obtain an image. The imaging devices 46 are mounted on the upper end of the cabin 31. The number of the imaging devices 46 is four to be disposed side by side in the circumferential direction so as to divide the 360° circumference of the cabin 31 into four sections.

The four imaging devices 46 are used to realize so-called around view images (viewpoint transformation images). While the details will be described later, the control device 50 of FIG. 2 can integrate the respective images captured by the imaging devices 46 disposed at the front, rear, left and right to generate a single image in real time as if the image were captured from a viewpoint looking down on the construction machine 1 from above. This image can be displayed on the display device 34 to assist an operator in checking a situation around the construction machine 1.

The GNSS antenna 47 receives signals from positioning satellites that composes a satellite positioning system such as GPS. The positioning signals received by the GNSS antenna 47 are input to the control device 50 or a receiving unit (not illustrated), and positioning calculation is performed. By performing the positioning operation, the position information of the construction machine 1 (in particular, the position information of the GNSS antenna 47) is calculated as, for example, latitude and longitude information. Although a high-precision satellite positioning system utilizing a GNSS-RTK method is used in this embodiment, this embodiment is not limited to this. As long as high-precision position coordinates can be obtained, other positioning system may be used. For example, it is conceivable that a relative positioning system (DGPS) or a geosynchronous satellite navigation augmentation system (SBAS) is used.

The direction sensor 48 is disposed in the rotating body 12. Therefore, even when the rotating body 12 rotates while the crawlers 11 are stopped, the direction of the rotating body 12 can be detected. As the direction sensor 48, for example, a magnetic sensor or a gyro sensor can be used.

The control device 50 includes a detection camera determination unit 51, a distance acquisition unit 52, a warning region intrusion determination unit 53, an object determination unit 54, an obstacle information output unit 55, a storage unit 56, an image transformation unit 57, a composite coordinate calculation unit 58, a position composite unit 59, an operation limitation region intrusion determination unit 60, an actuator deceleration instruction unit 61, an operation stop region intrusion determination unit 62, and an actuator stop instruction unit 63.

As described specifically, the control device 50 is configured as a computer and includes a CPU (arithmetic unit), a ROM, a RAM, and the like. In addition, an appropriate program for operating each unit of the construction machine 1 is stored in the above ROM. By this cooperation between the software and the hardware, the control device 50 is enabled to function as the detection camera determination unit 51, the distance acquisition unit 52, the warning region intrusion determination unit 53, the object determination unit 54, the obstacle information output unit 55, the storage unit 56, the image transformation unit 57, the composite coordinate calculation unit 58, the position composite unit 59, the operation limitation region intrusion determination unit 60, the actuator deceleration instruction unit 61, the operation stop region intrusion determination unit 62, and the actuator stop instruction unit 63 illustrated in FIG. 2.

The detection camera determination unit 51 determines whether or not at least one of the three Tof cameras 41 detects an object. When the object is detected, the detection camera determination unit 51 outputs, for each object, information (e.g., a camera number) for specifying the Tof camera that detects the object, and a position of the object in a Tof camera image, to the distance acquisition unit 52.

The distance acquisition unit 52 calculates a distance between the construction machine 1 and each of the objects detected by the detection camera determination unit 51. This distance can be obtained by calculating the position of the object in the Tof camera image as expressed in a coordinate system with the construction machine 1 as a reference (the world coordinate system described below).

The warning region intrusion determination unit 53 determines whether or not the object is in a warning region predetermined as the surroundings of the construction machine 1. This warning region is defined as a cylindrical region of a predetermined size centered on the construction machine 1, as illustrated by the code A1 in FIG. 1. Specifically, the warning region intrusion determination unit 53 compares the distance obtained by the distance acquisition unit 52 with a predetermined threshold value. When the distance between the construction machine 1 and the object is equal to or less than the threshold value, the warning region intrusion determination unit 53 determines that the object is inside the warning region A1. The warning region intrusion determination unit 53 outputs the determination result to the object determination unit 54.

The object determination unit 54 determines whether the object determined as to be inside the warning region A1 by the warning region intrusion determination unit 53 is a person or not. In this embodiment, this determination is performed on the basis of the received light intensity when each Tof camera 41 detects the object.

A rule that a worker who performs work at a construction site should previously wear a vest to which a reflective material having good light reflectivity is attached is determined. Therefore, when the worker is captured by each Tof camera 41, the received light intensity is large. On the other hand, when something other than a worker is captured by each Tof camera 41, the received light intensity is small. The object determination unit 54 can determine whether or not the obstacle detected by each Tof camera 41 is a person or not, on the basis of the size of the received light intensity.

The obstacle information output unit 55 generates information indicating the position of the obstacle determined to be inside the warning region A1 by the warning region intrusion determination unit 53, and the determination result determined by the object determination unit 54. The position of the obstacle can be expressed, for example, in a coordinate system in which a position at which a rotation axis of the rotating body 12 provided in the construction machine 1 intersects the ground is defined as an origin, and the right side of the rotating body 12 is defined as the +X axis, the front side is defined as the +Y axis, and the upper side is defined as the +Z axis (hereinafter referred to as the world coordinate system). This coordinate system rotates integrally with the rotation of the rotating body 12. The obstacle information output unit 55 outputs the generated information to the composite coordinate calculation unit 58 and the like.

The image output by the Tof camera 41 includes, for each pixel arranged in a matrix, information on the received light intensity of the reflection object and information on the distance between the camera and the reflection object at this pixel. The coordinates in the above world coordinate system can be obtained on the basis of the position of the pixel on the image and the information of the distance at this pixel. This transformation, which is not described in detail, can be performed by well-known geometric calculation by using the position and direction where each Tof camera 41 mounted on the cabin 31, the angle of view of each Tof camera 41, the effective pixel size of an image sensor, and the like.

The storage unit 56 is composed of, for example, a non-volatile memory. The storage unit 56 can store various information necessary for a process performed by the control device 50. This information includes a pixel coordinate transformation table for representing the respective object detection results by the Tof cameras 41 in the above world coordinate system. The information stored by the storage unit 56 includes a pixel coordinate transformation table for integrating images of the four imaging devices 46 to generate a single around view image. Further, the storage unit 56 stores data defining an operation stop region described below.

The image transformation unit 57 integrates the images obtained by the four imaging devices 46 to generate the single around view image. The pixel coordinate transformation table stored by the storage unit 56 is used for this image transformation. A method of creating an around view image is well known, and therefore detailed description is omitted here.

The composite coordinate calculation unit 58 performs coordinate transformation for displaying the position of the obstacle represented in the world coordinate system among the output results of the obstacle information output unit 55 at a corresponding position in the around view image. The pixel coordinate transformation table stored by the storage unit 56 is used for this coordinate transformation. This pixel coordinate transformation table can be created by a well-known geometric calculation, and therefore description is omitted.

The position composite unit 59 composites, to the around view image generated by the image transformation unit 57, an image indicating the output result of the obstacle information output unit 55 (i.e., the position of the obstacle) or the like by means of an icon or the like.

Figure 3:
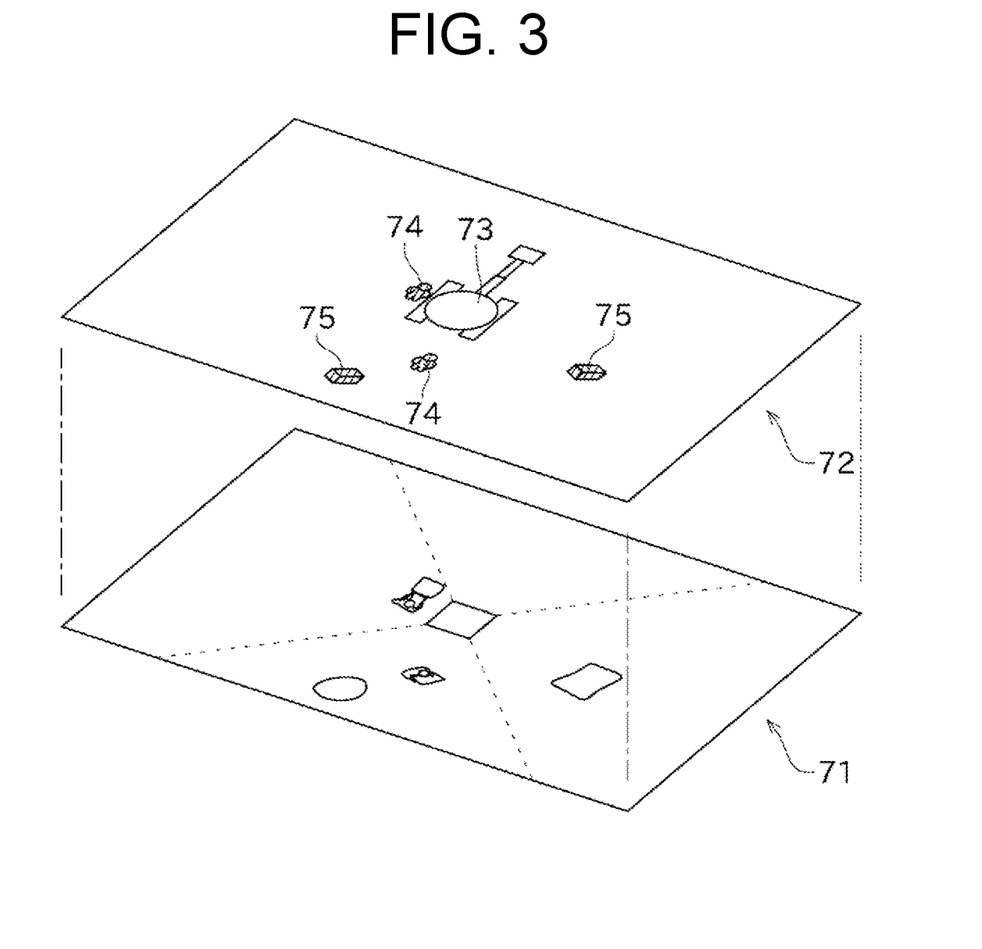
FIG. 3 is a conceptual diagram illustrating the synthesis of an around view image and an object determination result.
Figure 4:
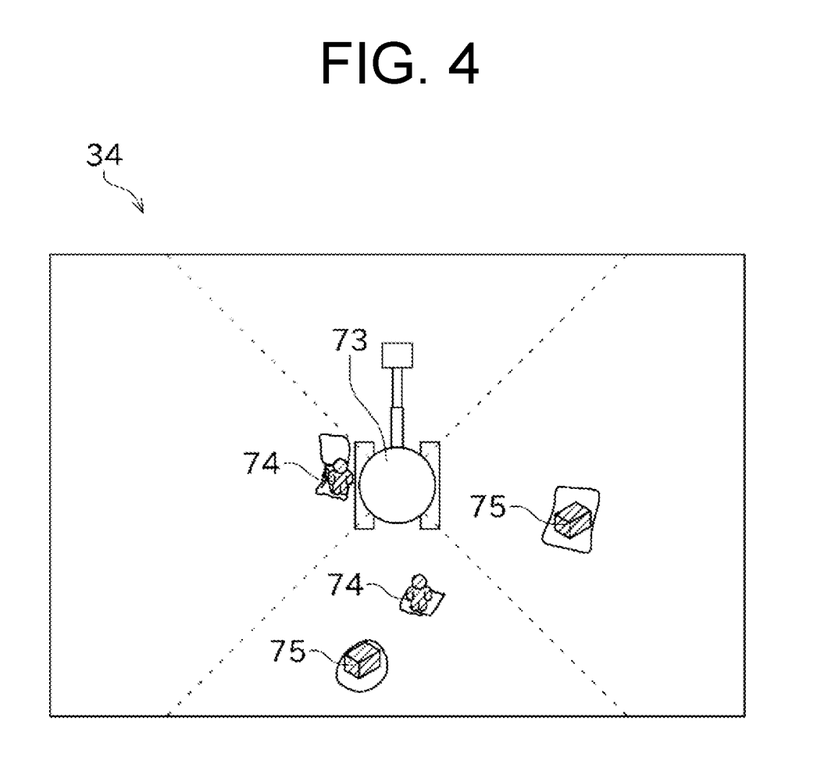
FIG. 4 is a diagram illustrating an example of a screen displayed on a display device.

FIG. 3 conceptually illustrates a state in which a determination display image 72 is superimposed on an around view image 71. FIG. 4 illustrates an actually composited image. As illustrated in FIG. 3, an image 73 of the own machine is drawn at the center of the determination display image 72. When the Tof cameras 41 detect objects and the objects are determined to be persons by the object determination unit 54, person icons 74 are displayed at positions of the around view image 71 corresponding to the objects in the determination display image 72. On the other hand, for the objects that are not determined to be persons by the object determination unit 54, object icons 75 are displayed in the determination display image 72.

Therefore, on the display device 34, as illustrated in FIG. 4, the object determination results are superimposed on an overhead image as if looking down on the construction machine 1 from above to be displayed. By generating and displaying this superimposed image in real time, the operator can reliably and easily grasp the situation that requires attention with respect to the surrounding obstacles.

The operation limitation region intrusion determination unit 60 determines whether or not an object determined to be a person by the object determination unit 54 is in an operation limitation region predetermined as the surroundings of the construction machine 1. Similar to the warning region A1, this operation limitation region is defined as a cylindrical region of a predetermined size centered on the construction machine 1. When the distance between the construction machine 1 and the object is equal to or less than a threshold value, the operation limitation region intrusion determination unit 60 determines that the object intrudes into the operation limitation region. The operation limitation region intrusion determination unit 60 outputs the determination result to the actuator deceleration instruction unit 61.

When the operation limitation region intrusion determination unit 60 determines that a person intrudes into the operation limitation region, the actuator deceleration instruction unit 61 automatically decreases the operation speed of the actuators such as the rotation motor 20.

The operation stop region intrusion determination unit 62 determines whether or not an object determined to be a person by the object determination unit 54 enters an operation stop region predetermined as the vicinity of the construction machine 1. This operation stop region is determined as a region that is easily a blind spot for an operator sitting on the driver seat 32, for example, a region behind the cabin 31, a left rear region, and a right rear region. The operation stop region may include a front or diagonally front region that is hidden by the boom 14 from the operator.

The information for determining the boundary of this operation stop region is predetermined and stored in the storage unit 56. The operation stop region intrusion determination unit 62 obtains the positional relationship of the object with respect to the construction machine 1, and determines that this object intrudes in the operation stop region when this object is inside the operation stop region. The operation stop region intrusion determination unit 62 outputs the determination result to the actuator stop instruction unit 63.

When the operation stop region intrusion determination unit 62 determines that a person intrudes in the operation stop region, the actuator stop instruction unit 63 automatically stops the operation speed of the actuators such as the rotation motor 20.

The control device 50 can control the operation of actuators such as the boom cylinder 17, the arm cylinder 18, the bucket cylinder 19, and the rotation motor 20 illustrated in FIG. 2 by transmitting electrical signals. The detailed configuration to realize the control of the actuators will be described later.

The control device 50 is electrically connected to the display device 34 and the notification device 36.

The display device 34 can appropriately output a content based on the process of the control device 50, such as the above around view image.

The notification device 36 can provide an operator with an alarm by outputting audio, particularly alert the operator to approaching people. However, the notification device 36 may be realized by a lamp such as an LED, a rotating light, or the like.

With the above configuration, the contact prevention device 100 of the construction machine 1 is composed of the Tof cameras 41, the imaging devices 46, the control device 50, the display device 34, and the notification device 36. With this contact prevention device 100, contact of a person with the construction machine 1 can be effectively prevented without needlessly reducing work efficiency.

Now, a specific configuration in which the actuator is decelerated by the actuator deceleration instruction unit 61 will be described.

Figure 5:
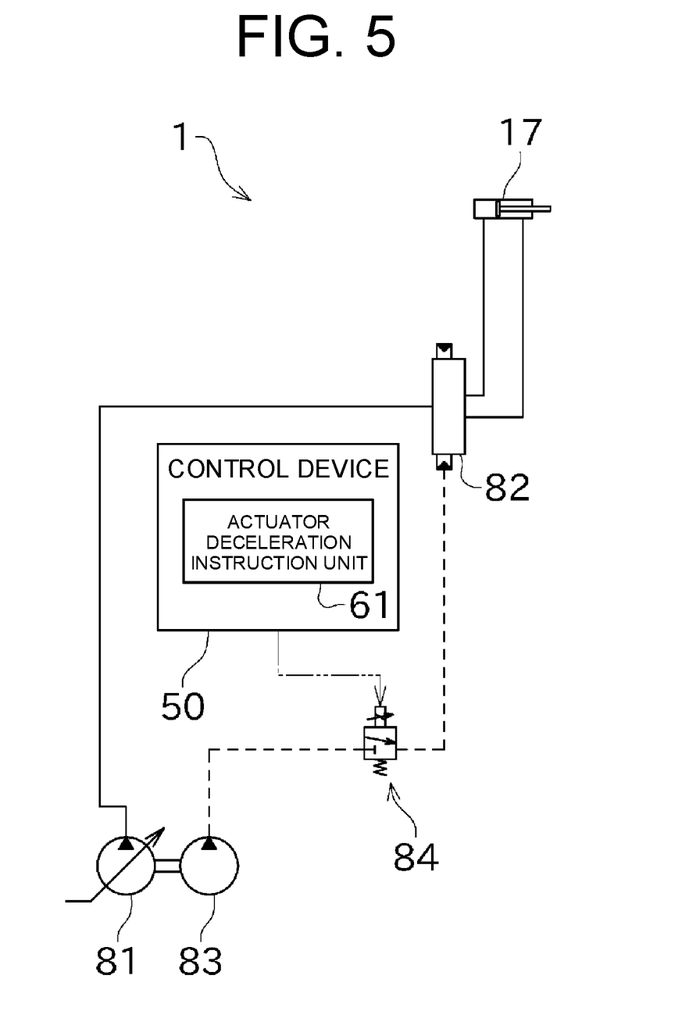
FIG. 5 is a schematic diagram illustrating a configuration for decelerating the operation of an actuator provided in the construction machine.

As illustrated in FIG. 5, the construction machine 1 includes a variable displacement hydraulic pump 81. A directional switching valve 82 is disposed between the hydraulic pump 81 and the boom cylinder 17, which is a kind of actuator.

The pilot output of a remote control valve is led to a pilot port of the directional switching valve 82. Although not illustrated in FIG. 5, the remote control valve is disposed between a hydraulic pump 83 for supplying pilot pressure and the directional switching valve 82.

The remote control valve transmits hydraulic oil to the directional switching valve 82 in response to operation of the operating members such as the operation lever 33 by the operator. Therefore, the spool of the directional switching valve 82 is displaced in accordance with an operation position at which the operator operates the operating member, so that the supply/stop of the hydraulic oil can be switched. As a result, the boom cylinder 17 can be expanded and contracted.

A proportional valve 84 is disposed between the hydraulic pump 83 and the remote control valve, or between the remote control valve and the directional switching valve 82. This proportional valve 84 can adjust the flow rate of the pilot hydraulic oil passing through this proportional valve 84 by changing the degree of opening in response to an input electrical signal.

The control device 50 (actuator deceleration instruction unit 61) controls the degree of opening of the proportional valve 84 by outputting an electrical signal to the proportional valve 84. Specifically, the control device 50 reduces the amount of displacement of the spool of the directional switching valve 82 by reducing the degree of opening of the proportional valve 84. Consequently, it is possible to reduce the driving speed of the actuators such as the boom cylinder 17.

Now, a specific configuration in which the actuators are stopped by the actuator stop instruction unit 63 will be described.

Figure 6:
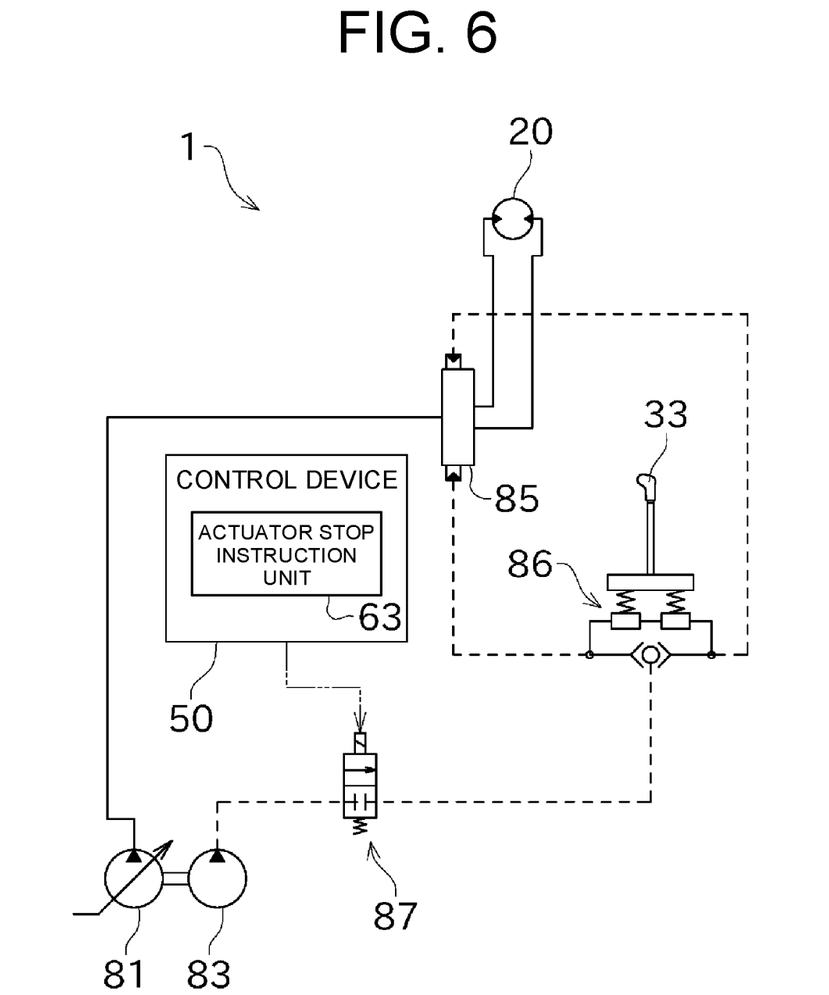
FIG. 6 is a schematic diagram illustrating a configuration for stopping the operation of the actuator.

As illustrated in FIG. 6, in the construction machine 1, a directional switching valve 85 is disposed between the variable displacement hydraulic pump 81 and the rotation motor 20 that is a type of actuator. The pilot output of a remote control valve 86 is led to the pilot port of the directional switching valve 85.

Accordingly, the spool of the directional switching valve 85 can be displaced in response to the operation position at which the operator operates the operation lever 33, so that the supply/stop of the hydraulic oil can be switched. As a result, the rotation motor 20 can be rotated in either the forward or reverse direction.

A solenoid valve 87 is disposed between the remote control valve 86 and the hydraulic pump 83 for supplying pilot pressure to this remote control valve 86. This solenoid valve 87 can switch opening and closing in accordance with an input electrical signal.

The control device 50 (actuator stop instruction unit 63) controls the opening and closing of the solenoid valve 87 by outputting an electrical signal to the solenoid valve 87. Specifically, the control device 50 stops supplying the pilot pressure to the directional switching valve 85 by closing the solenoid valve 87. As a result, the spool of the directional switching valve 85 becomes a neutral position, and therefore the drive of the actuators such as the rotation motor 20 can be forcibly stopped.

Figure 7:
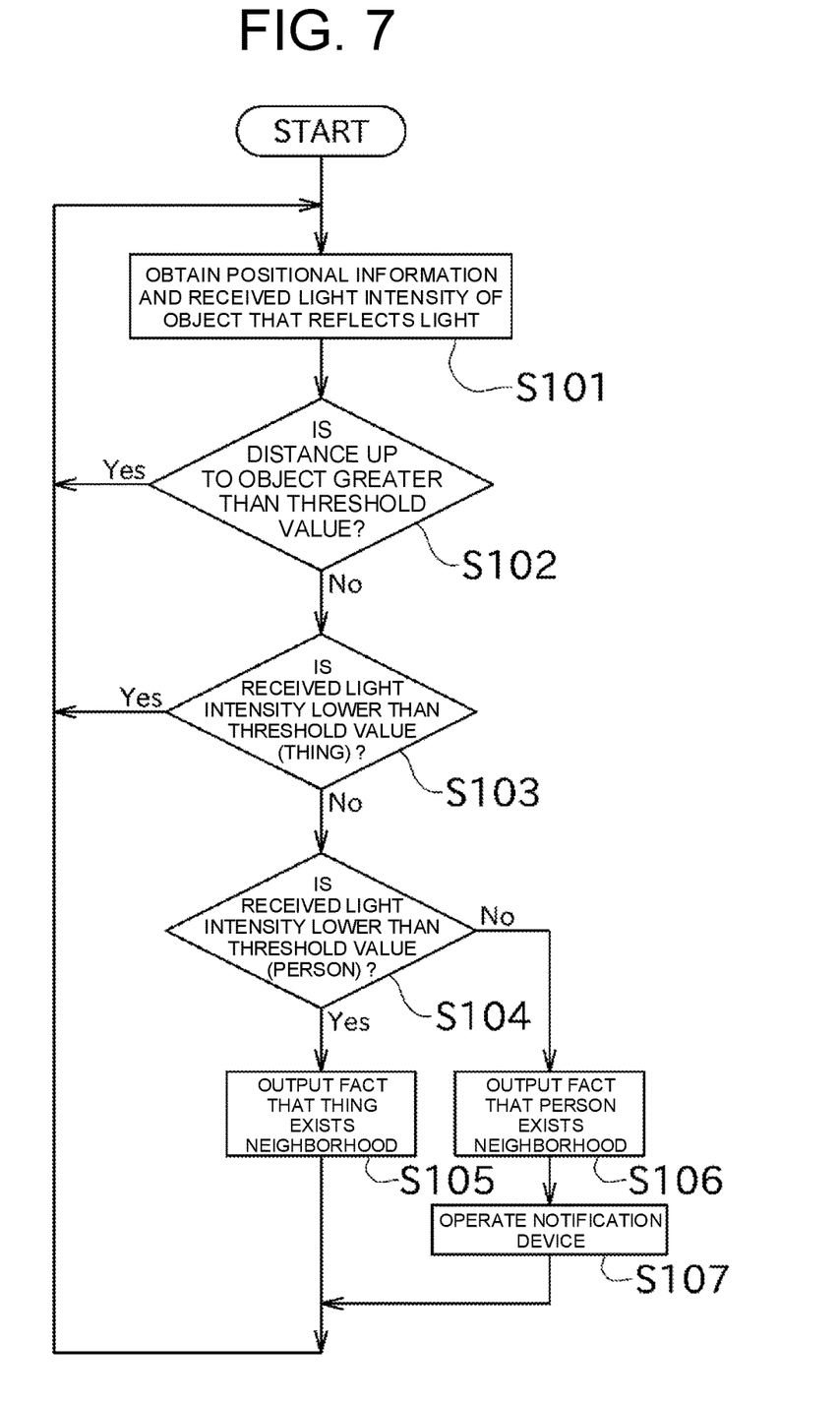
FIG. 7 is a flowchart illustrating a process related to an alarm to an operator, performed by a control device.

Now, the process by which the control device 50 detects the approach of a person and provides the operator with an alarm will be described in detail with reference to FIG. 7. FIG. 7 is a flowchart illustrating a process related to an alarm to an operator, performed by the control device 50.

First, the control device 50 performs an appropriate object detection process on images of the three Tof cameras 41 to obtain positional information and received light intensity of objects that reflect light (Step S101). This process is mainly realized by the detection camera determination unit 51. However, the object detection process may be realized by a computer provided with the Tof cameras 41.

Now, the warning region intrusion determination unit 53 determines, for each of the detected objects, whether or not a distance from the construction machine 1 to the object is greater than a predetermined threshold (Step S102). The distance from the construction machine 1 to each object is calculated by the distance acquisition unit 52 illustrated in FIG. 2. When the distance is greater than a predetermined threshold, the process returns to Step S101.

When the distance from the construction machine 1 to the object is equal to or less than the threshold value in the determination of Step S102, the object determination unit 54 determines whether or not the received light intensity detected by each Tof camera in the portion of the object is lower than a first threshold value (Step S103). The first threshold value used in Step S103 corresponds to the received light intensity required for detection of the object as some object (a person or a thing) by the object determination unit 54. When the received light intensity is lower than the first threshold, the process returns to Step S101.

When the received light intensity is equal to or greater than the first threshold in the determination of Step S103, the object determination unit 54 determines whether or not the received light intensity is lower than a second threshold (Step S104). The second threshold used in Step S104 corresponds to the received light intensity of a boundary at which the object determination unit 54 determines whether or not a person or a thing is detected for the object. When the received light intensity is lower than the second threshold value, the object determination unit 54 determines that the object is a thing. Accordingly, the obstacle information output unit 55 outputs a fact that a thing exists, and a position of the thing (Step S105). When the received light intensity is equal to or greater than the second threshold value in the determination of Step S104, the object determination unit 54 determines that the object is a person. Accordingly, the obstacle information output unit 55 outputs a fact that a person exists, and a position of the person (Step S106). When it is determined that the obstacle is a person, the control device 50 operates the notification device 36 to alert the operator (Step S107). In any case, the process then returns to Step S101.

The control device 50 can determine, in accordance with the determination result obtained in the process of FIG. 7, whether the person icon 74 is superimposed to be displayed or the object icon 75 is superimposed to be displayed at the position of the detected object in the display screen illustrated in FIG. 4. Therefore, the operator can easily grasp where the person and the object are located by the augmented reality image illustrated in FIG. 4.

Figure 8:
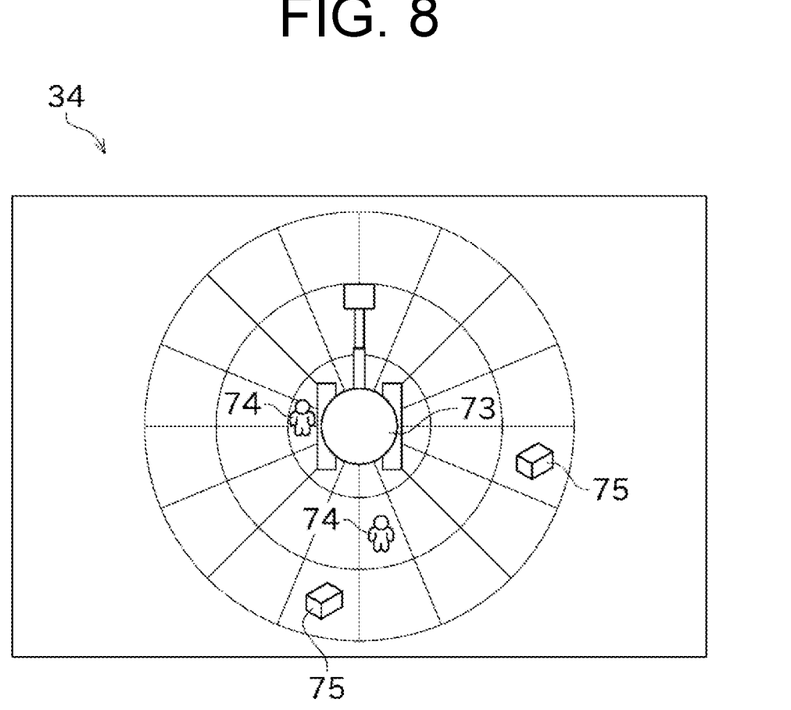
FIG. 8 is a diagram illustrating another example of a screen displayed on the display device.

However, the determination results of the person and the things are not limited to being superimposed on the around view image to be displayed as illustrated in FIG. 4. For example, as illustrated in FIG. 8, a configuration in which a figure obtained by dividing the region around the construction machine 1 in the circumferential direction and the distance direction as appropriate is displayed, and whether or not a person or a thing exists in any of the divided regions is indicated by a person icon 74 or an object icon 75 is considered.

Figure 9:
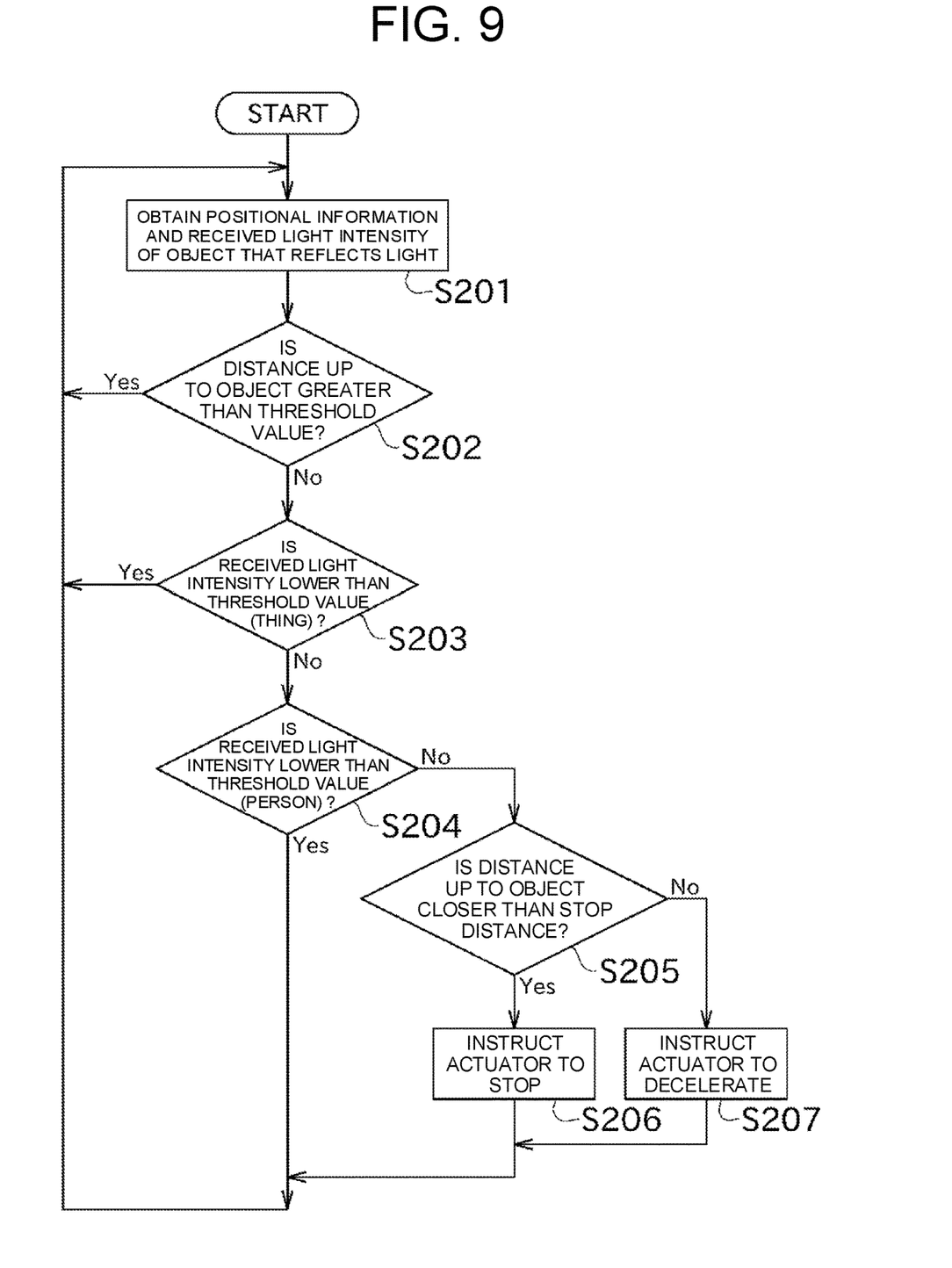
FIG. 9 is a flowchart illustrating a process for decelerating or stopping the operation of the actuator.

Now, control for automatically decelerating or stopping the operation of the actuators when a person is near the construction machine 1 will be described with respect to FIG. 9. FIG. 9 is a flowchart illustrating a process of decelerating or stopping the operation of the actuators.

Steps S201 to S204 of FIG. 9 are substantially the same as Steps S101 to S104 of FIG. 7, and therefore are not described. The process of Step S202 realizes a function of the operation limitation region intrusion determination unit 60 of FIG. 2. A threshold value used in Step S202 corresponds to the size of the operation limitation region. The operation limitation region may match or differ from the above warning region A1.

When in the determination of Step S204, the received light intensity of a detected object is equal to or greater than a threshold value of the received light intensity to be determined as a person, the operation stop region intrusion determination unit 62 determines whether or not a distance from the construction machine 1 to the object is smaller than a predetermined stop distance (Step S205). When the distance from the construction machine 1 to the object is smaller than the above stopping distance, the actuator stop instruction unit 63 instructs the actuator (such as the rotation motor 20 and the boom cylinder) to stop (Step S206). On the other hand, when the distance from the construction machine 1 to the object is equal to or greater than the stopping distance, the actuator deceleration instruction unit 61 instructs the actuator to decelerate (Step S207). In any case, the process then returns to Step S201.

Consequently, when the person is closer to the construction machine 1 than the determination threshold value of Step S202, the operation speed of the actuator is limited by the process of Step S207. The degree of this limitation may be constant, or may change such that the limitation (deceleration) increases as the distance between the construction machine 1 and the person reduces. When the person further approaches the construction machine 1, and the distance between the construction machine 1 and the person becomes smaller than the stopping distance that is the determination threshold value of Step S205, the actuators are forcibly stopped by the process of Step S206. Consequently, it is possible to avoid unexpected operation of the construction machine 1 when there is a person nearby.

Figure 10:
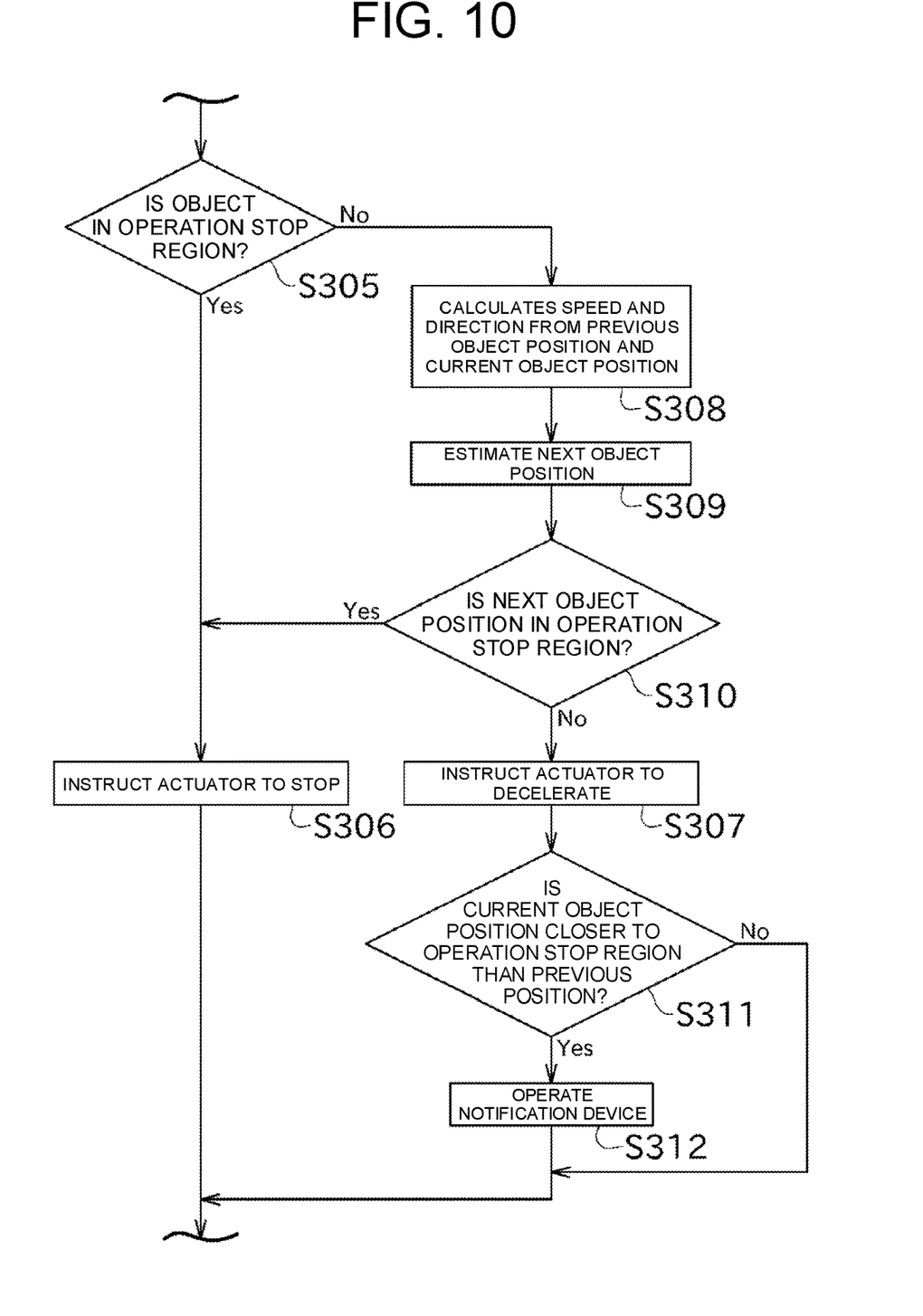
FIG. 10 is a flowchart illustrating a modification related to a part of the process of FIG. 9.

The processes described in Step S205 to Step S207 can be replaced by processes from Step S305 to Step S312 illustrated in FIG. 10. Theses processes will be described below.

In Step S305, the operation stop region intrusion determination unit 62 determines whether or not a position of the detected object is in a predetermined operation stop region. When the position of the object is in the operation stop region, the actuator stop instruction unit 63 instructs the actuators (such as the rotation motor 20 and the boom cylinder 17) to stop (Step S306).

When the position of the object is not in the operation stop region in the determination of Step S305, the control device 50 calculates the speed and direction at which the object moves from the change between the object position detected last time and the object position detected this time (Step S308). The position of this object is stored in, for example, the storage unit 56 each time an object is detected, so that the previously detected position of the object can be obtained. Then, the control device 50 estimates a next position of the object on the basis of the obtained speed and direction (Step S309).

Thereafter, the operation stop region intrusion determination unit 62 determines whether or not the estimated next object position is in the operation stop region or not (Step S310). When the next position of the object is in the operation stop region, the actuator stop instruction unit 63 instructs the actuator to stop in Step S306.

That is, in the process of FIG. 10, even when the current position of the object is not in the operation stop region, when the estimated next position of the object is in the operation stop region, the operation of the actuator is stopped. Consequently, the actuator of the construction machine 1 can be stopped at an early stage in a situation where a person is approaching the construction machine 1, taking into account the moving speed and direction of the person.

When the next position of the object is not in the operation stop region in the determination of Step S310, the actuator deceleration instruction unit 61 instructs the actuator to decelerate the operation of the actuators (Step S307). Thereafter, the control device 50 determines whether or not the current position is closer to the above operation stop region than the previous position on the basis of the moving speed and direction of the object calculated in Step S308 (Step S311). When the position of the object is approaching the operation stop region, the control device 50 operates the notification device 36 (Step S312). Consequently, the operator can early notice that the person is approaching a blind spot region of the construction machine 1.

As described above, the contact prevention device 100 for the construction machine 1 of this embodiment includes the Tof cameras 41, the object determination unit 54, the obstacle information output unit 55, and the notification device 36. Tof cameras 41 each include the light-emitting unit 42 and the light-receiving unit 43, and is capable of detecting timing at which the light-receiving unit 43 receives light from the light-emitting unit 42 which is reflected by hitting at an object and the received light intensity The object determination unit 54 determines the object on the basis of at least the received light intensity. The obstacle information output unit 55 outputs information related to an obstacle. The notification device 36 makes a notification in accordance with an output result from the obstacle information output unit 55. The obstacle information output unit 55 generates information related to the obstacle on the basis of a distance to the object acquired by each of the Tof cameras 41, and a determination result from the object determination unit 54.

Consequently, it is possible to detect the three-dimensional position of the obstacle to be detected by each Tof camera 41, and use the result of determining the attribute of the obstacle (e.g., human and other) in the object determination unit 54 to operate the notification device 36 only when, for example, a person approaches. Accordingly, while unexpected situations are prevented, work efficiency can be improved by reducing the number of situations in which work stops unnecessarily during work at a construction site or the like.

The contact prevention device 100 for the construction machine 1 of this embodiment includes the imaging devices 46 and the display device 34. The imaging devices 46 each image a surrounding of the construction machine 1. The display device 34 composites a position of the object detected by each Tof camera 41 to an image obtained by each imaging device 46, to perform display. The display device 34 is capable of compositing the position of the object to a corresponding position of an around view image obtained by transforming a viewpoint of an image output by each imaging device 46, to perform display.

Consequently, an operator intuitively grasps the surrounding situation through the around view image. In addition, the position of the detected object is displayed in the same image, so that an operator easily notice the status of the surrounding obstacle.

In the contact prevention device 100 for the construction machine 1 of this embodiment, control for decreasing a driving speed of an actuator provided in the construction machine 1 is performed in accordance with the output result from the obstacle information output unit 55.

Consequently, for example, when a person approaches the construction machine 1, the operation of the construction machine 1 is automatically decelerated, so that the operation of the construction machine 1 becomes more cautious and is unlikely to cause unexpected situations.

In the contact prevention device 100 for the construction machine 1 of this embodiment, the position of the object output by the obstacle information output unit 55 is included in the operation stop region, control for stopping the actuators provided in the construction machine 1 is performed.

Consequently, it is possible to prevent unexpected situations from occurring, when a person is in a particular region, taking into account blind spots for an operator.

In the contact prevention device 100 for the construction machine 1 of this embodiment, when the position of the object output by the obstacle information output unit 55 is not included in the operation stop region, and is changing in such a direction as to approach the operation stop region, the notification device 36 makes a notification.

Consequently, for example, when a person is approaching a region that is a blind spot for an operator, the operator easily notices the person at an early stage.

Although the preferred embodiment of the present invention is described above, the configuration as described above can be modified as described below, for example.

The object determination unit 54 can also determine whether or not an object that reflects light is a person or a thing on the basis of the shape of the region of pixels with high received light intensity in addition to the received light intensity itself. For example, a reflective material that is fixed to a vest worn by a worker should be a special shape, such as a star shape. At a construction site, for example, a reflective material may be attached to a utility pole to prevent a traffic accident, and the above configuration enables good determination between a person and a utility pole.

The shape of the reflective material fixed to the vest is made different for each worker, so that it is possible to determine not only whether an object is a person or not, but also who the person is. The information (such as name) stored in association with this identification result in advance may be composited to an around view image, and displayed on the display device 34.

The obstacle position and the determination result output by the obstacle information output unit 55 may be configured to be notified only by auditory sense by the notification device 36 without being displayed on the display device 34.

A notification sound generated by the notification device 36 can also be made different in accordance with change in the distance between the construction machine 1 and the person. For example, change of volume, change of a pitch of sound, or change of a pattern of pronunciation/pause can be considered.

For example, a warning that a person is approaching is be displayed on the display device 34, so that the operator can be notified of the warning. In this case, the display device 34 also serves as the notification device 36.

The viewpoint transformation image is not necessarily limited to being an overhead image obtained by looking down from directly above, but can, for example, be an image obtained by looking diagonally from above.

The Tof cameras 41 and the imaging devices 46 may be disposed at any number of positions, as long as the entire circumference of the construction machine 1 can be shared and captured in the field of view.

The present invention can be applied not only to the construction machine 1 but also to other work machines having various configurations and applications. For example, the present invention can be applied to a work machine that is not a rotating type. The present invention can also be applied to a work machine that does not have a traveling device.

DESCRIPTION OF REFERENCE NUMERALS 1 construction machine (work machine)
34 display device
36 notification device
41 Tof camera (three-dimensional measurement sensor)
42 light-emitting unit
43 light-receiving unit
46 imaging device
54 object determination unit
55 obstacle information output unit
100 contact prevention device

The invention claimed is:

1. A contact prevention device for a work machine comprising:
   a three-dimensional measurement sensor that includes a light-emitting unit and a light-receiving unit, and is capable of detecting timing at which the light-receiving unit receives light from the light-emitting unit which is reflected by hitting at an object and the received light intensity;
   an object determination unit that determines the object on the basis of at least the received light intensity, wherein the object determination unit compares the light intensity to a first threshold and if equal to or greater than then to a second threshold set higher than the first threshold;
   an obstacle information output unit that outputs information related to an obstacle; and
   a notification device that makes a notification in accordance with an output result from the obstacle information output unit, wherein
   the obstacle information output unit generates information related to the obstacle on the basis of a distance to the object acquired by the three-dimensional measurement sensor, and a determination result from the object determination unit.

2. The contact prevention device for a work machine according to claim 1 comprising:
   an imaging device that images a surrounding of the work machine; and
   a display device that composites a position of the object detected by the three-dimensional measurement sensor to an image obtained by the imaging device, to perform display, wherein
   the display device is capable of compositing the position of the object to a corresponding position of a viewpoint transformation image obtained by transforming a viewpoint of an image output by the imaging device, to perform display.

3. The contact prevention device for a work machine according to claim 1, wherein
   control for decreasing a driving speed of an actuator provided in the work machine is performed in accordance with the output result from the obstacle information output unit.

4. The contact prevention device for a work machine according to claim 1, comprising
   a storage unit that stores an operation stop region which is determined as a surrounding of the work machine, wherein
   when the position of the object output by the obstacle information output unit is included in the operation stop region, control for stopping the actuator provided in the work machine is performed.

5. The contact prevention device for a work machine according to claim 4, wherein
   when the position of the object output by the obstacle information output unit is not included in the operation stop region, and is changing in such a direction as to approach the operation stop region, the notification device makes a notification.

* * * * *